United States Patent
Leytus et al.

(10) Patent No.: US 9,312,896 B1
(45) Date of Patent: *Apr. 12, 2016

(54) DEVICE FOR RANKING WIRELESS LINKS

(71) Applicants: Steven P. Leytus, Redmond, WA (US); Jason Glass, Cross Plains, TN (US)

(72) Inventors: Steven P. Leytus, Redmond, WA (US); Jason Glass, Cross Plains, TN (US)

( * ) Notice: Subject to any disclaimer, the term of this patent is extended or adjusted under 35 U.S.C. 154(b) by 16 days.

This patent is subject to a terminal disclaimer.

(21) Appl. No.: 14/269,402

(22) Filed: May 5, 2014

Related U.S. Application Data

(63) Continuation of application No. 13/323,016, filed on Dec. 12, 2011, now Pat. No. 8,737,927.

(51) Int. Cl.
*H04W 28/00* (2009.01)
*H04B 1/10* (2006.01)
*H04W 72/08* (2009.01)
*H04W 28/04* (2009.01)

(52) U.S. Cl.
CPC ............. *H04B 1/1027* (2013.01); *H04W 28/04* (2013.01); *H04W 72/082* (2013.01); *H04B 2001/1045* (2013.01)

(58) Field of Classification Search
CPC .................. H04W 72/082; H04W 28/04
USPC ........ 455/452.1, 452.2, 509, 3.01, 501, 3.06, 455/513, 63.1, 67.11, 67.13, 414.3; 709/200

See application file for complete search history.

(56) References Cited

U.S. PATENT DOCUMENTS

| | | | |
|---|---|---|---|
| 2005/0050135 A1* | 3/2005 | Hallermeier | 709/200 |
| 2005/0280096 A1* | 12/2005 | McKay et al. | 257/369 |
| 2011/0263216 A1* | 10/2011 | Lee et al. | 455/127.1 |
| 2012/0069131 A1* | 3/2012 | Abelow | 348/14.01 |
| 2012/0099514 A1* | 4/2012 | Bianchetti et al. | 370/312 |

* cited by examiner

*Primary Examiner* — John J Lee
(74) *Attorney, Agent, or Firm* — Timothy E. Siegel Patent Law, PLLC; Timothy E. Siegel

(57) ABSTRACT

A machine which accepts a frequency set and ranks each frequency of said frequency set relative to other frequencies of said frequency set, according to susceptibility to intermodulation product interference from said set of frequencies.

11 Claims, 2 Drawing Sheets

DEVICE FOR RANKING WIRELESS LINKS

RELATED APPLICATION

This is a continuation from application Ser. No. 13/323,016, filed on Dec. 12, 2011, which is incorporated by reference as if fully set forth herein.

BACKGROUND

When coordinating RF transmitters it is important to take into account the phenomenon of intermodulation (IM) distortion. Intermodulation distortion is caused by non-linear amplifiers and signal processing used in most audio hardware. Intermodulation distortion between two or more frequencies will form additional frequency signals (intermodulation products). These new signals occur at the sum and difference frequencies of the original signals and at multiples of those sum and difference signals. If intermodulation products fall within the bandwidth of a receiver, intermodulation interference may occur.

Those configuring wireless equipment for a live entertainment event, typically referred to as "RF coordinators," are faced with many challenges. Typically, for a concert or a sporting event, multiple systems independently operating in parallel communicate by means of wireless signals. These systems may collectively use dozens of wireless channels, each typically having a width on the order of 25 KHz.

In a live concert, there are wireless channels assigned to lead singers, various accompanying instruments, backup singers, in-ear monitors worn by musicians, and two-way radio communications between people coordinating the performance. In addition, if there is news coverage of the event the news reporters will have wireless communication devices, also competing for clean spectrum space.

Sporting events also have a pall mall assortment of sound sources that must be transmitted wirelessly to receivers. Coaches and assistant coaches are connected by wireless units. News crews are equipped with wireless communication devices.

Moreover, clean spectrum space is not necessarily easy to find, as the 470 MHZ to 700 MHZ spectrum typically used for live events is, for the most part, shared with UHF TV stations. Because of this, even the same concert, with the same set of performers and instruments, cannot have the same wireless channel assignments from one city to the next on a multi-city tour.

Avoiding interference caused by intermodulation products is a critical issue in this environment. There are software tools available to assist an RF coordinator in assigning channels to their wireless equipment. The current state of the art is for the software tool to perform an intermodulation analysis and compute a frequency set. The resultant frequency set includes a list of frequencies that are guaranteed to be "intermodulation-compatible"—that is, the intermodulation products computed from the frequencies in the frequency set are guaranteed to be a specified distance removed from each frequency in the set. Sometimes, when intermodulation analysis is performed using strict criteria for frequency survival then the resultant frequency set is too small to accommodate all the audio gear that requires channel assignments. In this case the intermodulation analysis can be repeated using less stringent frequency survival criteria, and this results in a frequency set that contains more members but which is also less reliable than one computed using stricter criteria. Typically, all frequencies in a frequency set are treated as being equally reliable and the RF coordinator typically assigns them, in no particular order, to their wireless equipment. To be more exact, an RF coordinator assigns channels to their wireless equipment, where a channel is a frequency band (typically 25 KHz wide) whose center frequency is a member of the frequency set.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

In one aspect, the present invention takes the form of a machine which accepts a frequency set and ranks each frequency relative to other frequencies of the set, according to susceptibility to interference from intermodulation products generated by other frequencies in the frequency set.

In addition to the exemplary aspects and embodiments described above, further aspects and embodiments will become apparent by reference to the drawings and by study of the following detailed descriptions.

BRIEF DESCRIPTION OF THE DRAWINGS

Exemplary embodiments are illustrated in referenced drawings. It is intended that the embodiments and figures disclosed herein are to be considered illustrative rather than restrictive.

DETAILED DESCRIPTION OF THE PREFERRED EMBODIMENT(S)

Figure 1:
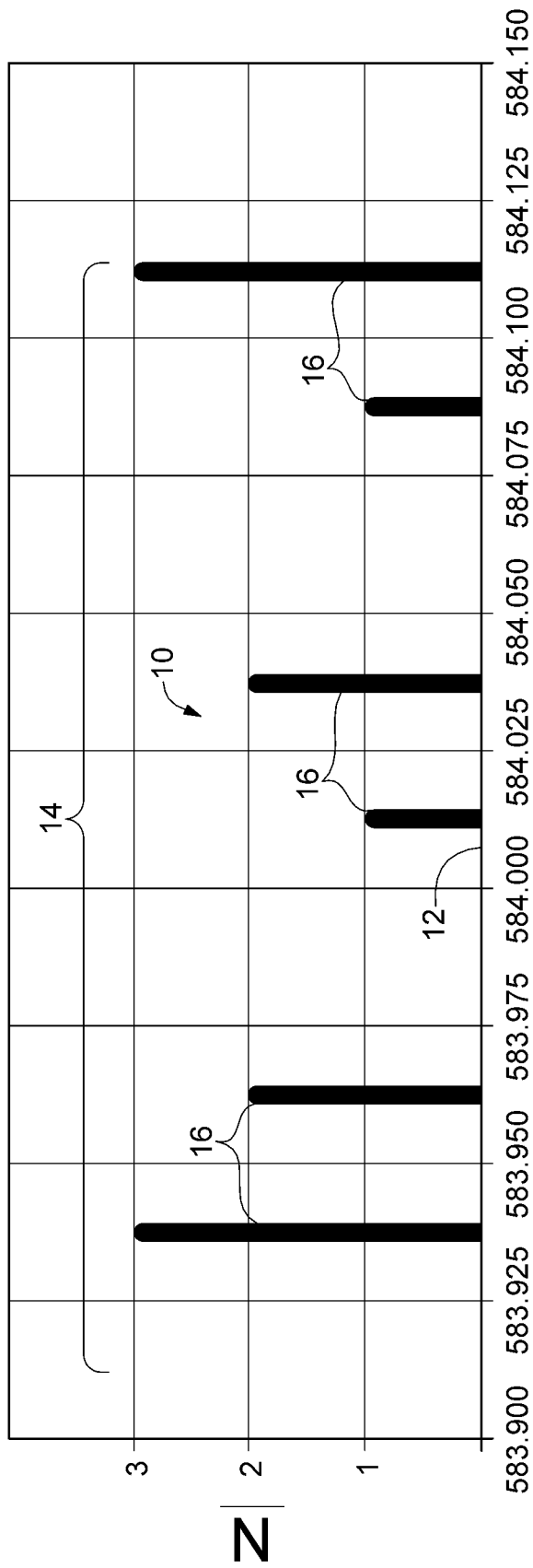
FIG. 1 is an illustration of a frequency window, containing some intermodulation products, for an intermodulation product interference calculation.

In the United States, in typical live entertainment event performance wireless configuration environments the frequency band from 470 MHz to 700 MHz is utilized. Furthermore, in many venues a good deal of this spectrum is used by digital TV broadcasters. The job of an RF coordinator is to assign wireless channels to a variety of wireless devices that will be in operation during the event. Due to RF interference from digital TV stations and the phenomenon of intermodulation interference, it is difficult to identify channels that will be free of RF interference and which are also free of intermodulation interference.

Currently, to address the issue of intermodulation interference, an intermodulation analysis is performed that results in a set of frequencies that fall on 25 KHz boundaries (this set is henceforth referred to as "frequency set" for ease of presentation).

Ideally in the frequency set no intermodulation product falls within a pre-specified distance of any frequency in the set. If the frequency set is too small to accommodate all sound sources, then the intermodulation analysis can be repeated using more relaxed criteria, which will result in a larger frequency set. This results, however, in intermodulation products occurring closer to frequencies in the set, thereby potentially causing intermodulation interference.

To date, the frequencies in a frequency set have been utilized as if they were equally reliable. Such usage does not take into consideration the hierarchy of importance that exists among the sound sources that need to be assigned channels. To address this problem, a preferred embodiment of a frequency set computational system, not only computes a frequency set, but also ranks the frequencies found according to each frequency's susceptibility to interference from intermodulation products.

Intermodulation products are classified by their order (2nd, 3rd, 4th, 5th, . . . Nth). The odd order products include terms that fall within the frequency range of the frequency set. In particular, the $3^{rd}$ and $5^{th}$ order products are the primary sources of intermodulation interference, as the higher order products have lower amplitude. A reasonably complete analysis can be performed by computing just the following IM products:

Two-Transmitter, 3rd-Order Products→Test A
Three-Transmitter, 3rd-Order Products→Test B
Two-Transmitter, 5th-Order Products→Test C For each one of these sets of intermodulation products an elimination test (as named above) can be performed in which starting with a randomly selected frequency pair or triplet, intermodulation products are computed and used to eliminate candidate frequencies within a pre-specified range, with the test progressing through every possible pair or triplet of the surviving frequencies. When creating an intermodulation-compatible frequency set, these 3 tests can be combined in any one of seven different ways (that is test A alone, test B alone, test C alone, test A and test B, etc.), in order to obtain a desired level of stringency and reliability.

In a preferred embodiment, running a first test (typically Test A) may reduce the number of available frequencies to a number reasonably coincident with the number of frequencies needed. At this point, if additional tests resulted in the elimination of more frequencies, the resultant set would be too small to accommodate all of the required equipment channels. Accordingly, when an additional test is run (typically Test B) it is not used to eliminate frequencies, but rather to identify the remaining frequencies that will experience intermodulation interference, within the pre-specified range, from a known IM product. Such channels are classified as having a lower "stringency." When a third test is run (typically Test C), frequencies of three different stringencies will be found. This greatly eases the task of an RF coordinator in finding a workable frequency set, particularly when a large number of wireless channels are required, because he can use the frequencies with the lower stringencies. Even though they do have IM product interference, within the pre-specified range, they are still better than many other channels, and can be used for some of the lower priority sound sources. (The pre-specified range can be set as a fixed parameter in the program, or computed from other parameters, directly before the tests, and can vary between Test A, Test B and Test C) In one preferred embodiment, the pre-specified ranges are 99 KHz for Test A, 49 KHz for Test B, and 89 KHz for Test C.

Figure 2:
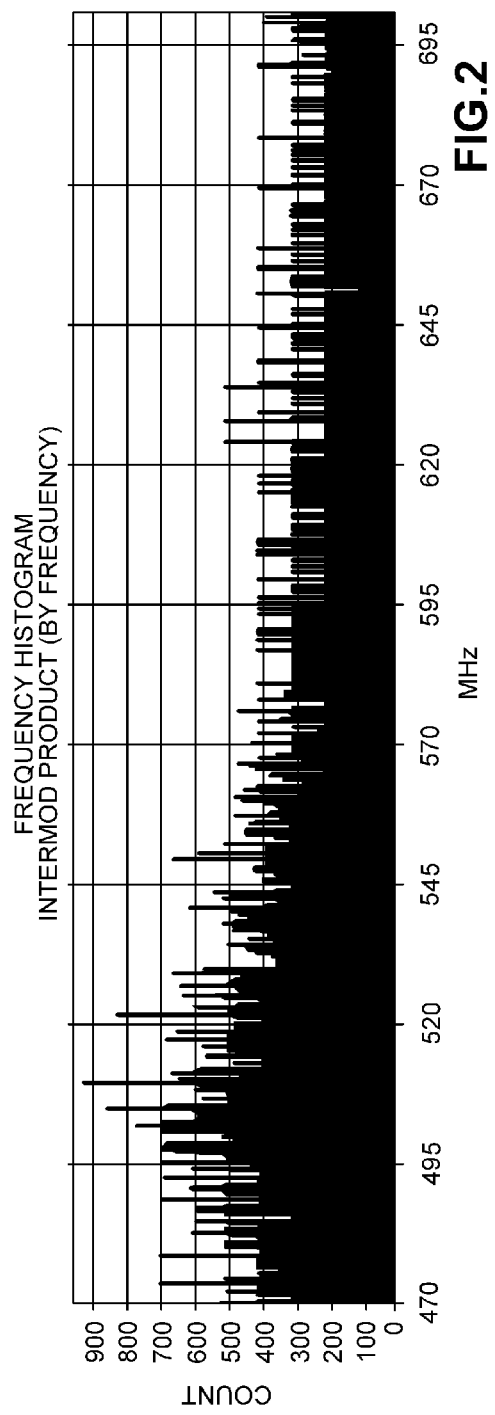
FIG. 2 is an illustration of a wireless spectrum divided into 25 KHz filter widths, and where the height of each vertical line represents the number of intermodulation products falling within a particular filter width.
Figure 3:
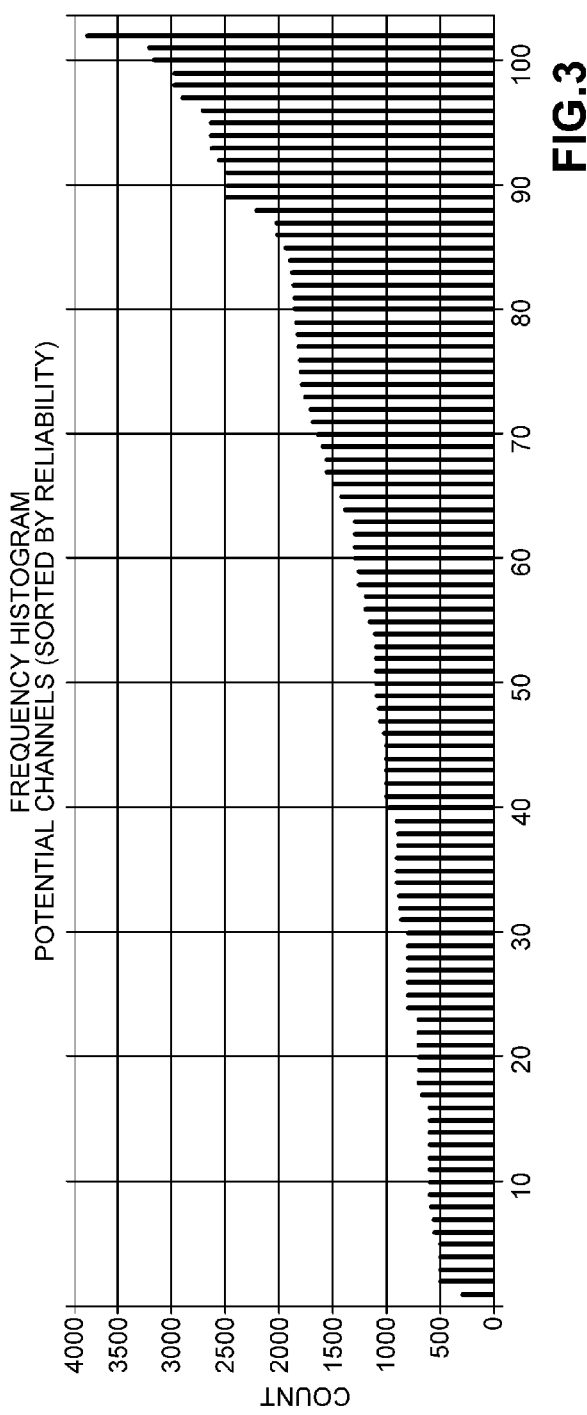
FIG. 3 is an illustration of a set of frequency channels sorted according to number of intermodulation products that are within a fixed frequency distance from each channel.

After a frequency set is generated, the frequencies within the set are ranked in terms of their susceptibility to interference caused by intermodulation products at nearby frequencies. Referring to FIG. 1, showing a portion of the wireless spectrum 10, for a 25 KHz boundary 12 the number of intermodulation products 16 in a 225 KHz frequency window 14 about boundary 12 is determined, and is designated by an intermodulation interference intensity parameter symbol, for example "$Q_n$" for frequency n. FIG. 2 shows the number of intermodulation products from a set of 100 surviving frequencies, falling directly on each 25 KHz boundary of the wireless spectrum. Referring to FIG. 3, the frequencies are then ranked according to $Q_n$, which in the preferred embodiment shown is the number of intermodulation products falling within a pre-specified frequency window that is symmetric about frequency n. Although the vertical bars are not labeled by frequency in FIG. 3, the software maintains a frequency assignment for each one.

In an alternative preferred embodiment, $Q_n$ represents the sum of the intermodulation products within a threshold frequency distance from frequency n, weighted inversely to frequency distance from frequency n. In an additional alternative embodiment, the weighting is also by strength of the intermodulation products. There are many possible candidate computations for Q, with the principal trade off being between computational intensity and accurate assessment of effect of intermodulation distortion.

Because not every sound source used in a live entertainment event is of equal importance to overall event success, the ranked frequency set is invaluable to the RF coordinator. In the case of a live concert (sporting events are analogous), for example, it is typically extremely important that the lead singer's voice be reproduced as accurately as possible. Drums, however, do not have the same requirement for production with perfect fidelity. Backup singers may only chime in for a fairly small portion of the concert, and therefore may not be entirely crucial. In the case of a sporting event, the wireless communication between members of the coaching staff of each team may be given great importance. Of course, the degradation of every sound source is undesirable, but it is still desirable to minimize the chance of degradation on the most important channels, even when the consequence is a greater chance of degradation on the less frequently used channels or channels that are less important to overall concert sound quality.

Accordingly, in a preferred method the best channel (lowest Q) is assigned to the highest value sound source, typically the lead singer, with other channel assignments made according to an evaluation of the importance of good reproduction of each sound source.

In one preferred embodiment, the RF coordinator is a person. In an alternative preferred embodiment, however, the human RF coordinator has entered a hierarchy of channel uses, and the assignment is performed automatically by the software.

In the first above-noted embodiment a human assignor directly assigns a frequency having low intermodulation interference to the lead singer's wireless microphone. In the second-noted embodiment the person planning the concert enters all of the equipment to be used and gives an importance ranking to each, with the lead singer's microphone most likely given the top ranking. The software then assigns the best frequency to the lead singer's microphone.

In one preferred embodiment, an evaluation is also made of which channels contribute the most to intermodulation products, and those channels are not used or assigned to infrequently used and reasonably quiet (or away from the central action) sound sources, such as an oboe or a backup singer.

Skilled person will recognize that not every hardware channel has a bandwidth of 25 KHz, and that IM products do not create the only limitation on channel assignments. For example, some products use channels with 5 KHz or 100 KHz bandwidths. In a preferred embodiment, the software includes a system for permitting wider or narrower bandwidth devices to be accommodated, by permitting a user to enter the bandwidth characteristics of a hardware channel, as well as any other limitations on use.

While a number of exemplary aspects and embodiments have been discussed above, those possessed of skill in the art will recognize certain modifications, permutations, additions and sub-combinations, thereof. It is therefore intended that the following appended claims and claims hereafter introduced are interpreted to include all such modifications, permutations, additions and sub-combinations as are within their true spirit and scope.

The invention claimed is:

1. A machine, comprising: a system for permitting a user to enter bandwidth characteristics of hardware channels, which thereby accepts a frequency set and wherein said machine computes the susceptibility to intermodulation product interference by finding the number and effect of intermodulation products within a frequency range of each frequency of said frequency set, and then ranks each frequency of said frequency set relative to other frequencies of said frequency set, according to susceptibility to intermodulation product interference from said frequency set as indicated by the number and effect of intermodulation products within said frequency range.

2. The machine of claim 1, further being defined as a computer executing a program.

3. The machine of claim 1, wherein said ranking includes classifying some frequencies into a set of vulnerable frequencies that are so susceptible to interference from intermodulation products that said set of vulnerable frequencies is eliminated from said frequency set.

4. The machine of claim 1, wherein said frequencies are RF frequencies.

5. The machine of claim 1, wherein said machine computes said frequency set, and then accepts said set from itself.

6. The machine of claim 1, wherein said system for permitting a user to enter bandwidth characteristics of hardware channels, permits a user to enter channel bandwidth.

7. The machine of claim 1, further permitting a user to input a set of prospective channel uses, ranked by importance.

8. The machine of claim 7, wherein said machine automatically assigns channels to channel uses, in reliance on said ranking and computation of intermodulation product interference.

9. The machine of claim 1, further wherein finding the number and effect of intermodulation products within a frequency range of each frequency of said frequency set, includes computing two-transmitter, $3^{rd}$-order products of said frequency set.

10. The machine of claim 1, further wherein finding the number and effect of intermodulation products within a frequency range of each frequency of said frequency set, includes computing three-transmitter, $3^{rd}$-order products of said frequency set.

11. The machine of claim 1, further wherein finding the number and effect of intermodulation products within a frequency range of each frequency of said frequency set, includes computing two-transmitter, $5^{th}$-order products of said frequency set.

* * * * *